United States Patent
Padovani et al.

(10) Patent No.: US 10,681,499 B2
(45) Date of Patent: Jun. 9, 2020

(54) METHODS AND SYSTEMS FOR EVALUATING APPLICATIONS IN AN APPLICATION DISTRIBUTION PLATFORM

(71) Applicant: salesforce.com, inc., San Francisco, CA (US)

(72) Inventors: Mattia Padovani, San Francisco, CA (US); Rebecca Greenberg, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 16/050,960

(22) Filed: Jul. 31, 2018

(65) Prior Publication Data

US 2020/0045506 A1 Feb. 6, 2020

(51) Int. Cl.
*H04W 24/00* (2009.01)
*H04W 4/029* (2018.01)
*H04W 64/00* (2009.01)
*H04L 12/58* (2006.01)
*G06F 16/29* (2019.01)

(52) U.S. Cl.
CPC ............ *H04W 4/029* (2018.02); *G06F 16/29* (2019.01); *H04L 51/20* (2013.01); *H04W 64/00* (2013.01); *H04L 51/04* (2013.01)

(58) Field of Classification Search
CPC ....... H04W 4/029; H04W 64/00; G06F 16/29; H04L 51/20; H04L 51/04
See application file for complete search history.

(56) References Cited

U.S. PATENT DOCUMENTS

| | | | |
|---|---|---|---|
| 2012/0011196 A1* | 1/2012 | Green | G06Q 10/107 709/203 |
| 2013/0059606 A1* | 3/2013 | Pujol | H04W 4/023 455/456.3 |
| 2018/0278700 A1* | 9/2018 | Diem | H04L 63/101 |
| 2019/0124021 A1* | 4/2019 | DeMattei | H04L 51/04 |

* cited by examiner

*Primary Examiner* — Barry W Taylor
(74) *Attorney, Agent, or Firm* — Morris & Kamlay LLP

(57) ABSTRACT

A method for creating a dynamic entity location map, includes sending an electronic communication to a first entity, obtaining, when the electronic communication is opened, notification data, calculating a location at which the electronic communication was opened based on the notification data, storing, in a database, a record that contains an association of the location and the first entity, wherein the database stores a plurality of records of entities with associated location data, and generating a map interface that displays a geographical region and displays an icon for the first entity, the icon being displayed at a position within the geographical region based on the location associated with the first entity.

22 Claims, 4 Drawing Sheets

| Entity | Email | Title | Location | Time | Device | Context |
|---|---|---|---|---|---|---|
| John A. Smith | jas@aaa.com | Associate | 40.7,-73.8 | 4/23/2018 9:53 | Desktop | Office |
| John A. Smith | jas@aaa.com | Associate | 40.7,-73.9 | 4/24/2018 10:07 | Desktop | Office |
| Jane B. Jones | jbj@bbb.com | Director | CA, USA | 4/24/2018 11:34 | Desktop | |
| Leon C. Smith | lss@ccc.com | Counsel | Germany | 4/25/2018 13:22 | Mobile | |
| John A. Smith | jas@aaa.com | Associate | 40.7,-73.8 | 4/26/2018 7:46 | Desktop | Office |
| Mimi D. Jones | mdj@ddd.com | HR | Washington, DC | 4/26/2018 8:33 | Tablet | Home |
| John A. Smith | jas@aaa.com | Associate | 38.9,-77 | 4/27/2018 9:15 | Mobile | Traveling |

| Entity | Email | Title | Location | Time | Device | Context |
|---|---|---|---|---|---|---|
| John A. Smith | jas@aaa.com | Associate | 40.7,-73.8 | 4/23/2018 9:53 | Desktop | Office |
| John A. Smith | jas@aaa.com | Associate | 40.7,-73.9 | 4/24/2018 10:07 | Desktop | Office |
| Jane B. Jones | jbj@bbb.com | Director | CA, USA | 4/24/2018 11:34 | Desktop | |
| Leon C. Smith | lss@ccc.com | Counsel | Germany | 4/25/2018 13:22 | Mobile | |
| John A. Smith | jas@aaa.com | Associate | 40.7,-73.8 | 4/26/2018 7:46 | Desktop | Office |
| Mimi D. Jones | mdj@ddd.com | HR | Washington, DC | 4/26/2018 8:33 | Tablet | Home |
| John A. Smith | jas@aaa.com | Associate | 38.9,-77 | 4/27/2018 9:15 | Mobile | Traveling |

FIG. 1

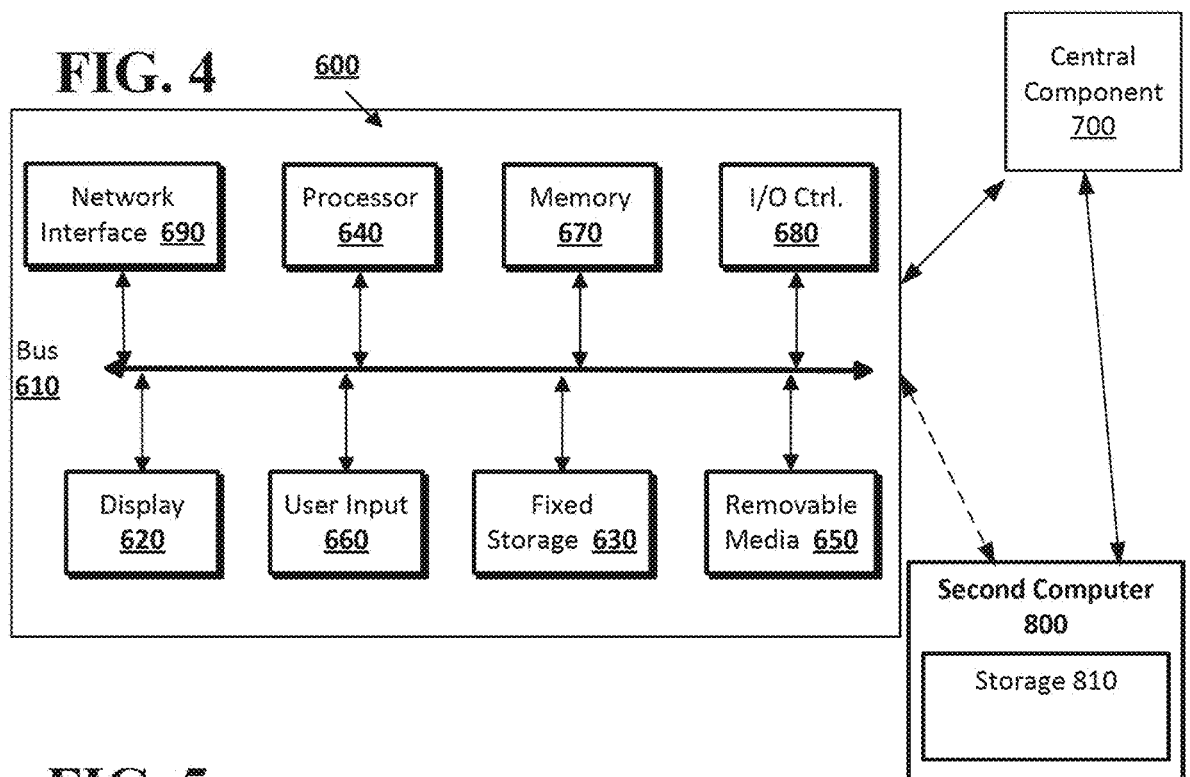
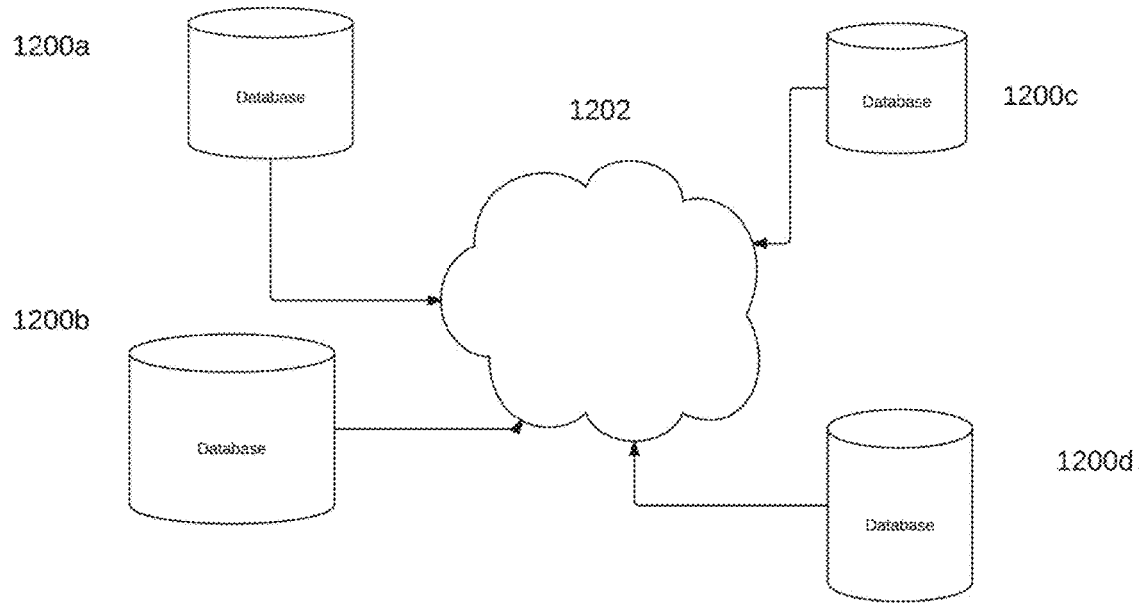

METHODS AND SYSTEMS FOR EVALUATING APPLICATIONS IN AN APPLICATION DISTRIBUTION PLATFORM

BACKGROUND

A business person, such as a sales representative, may frequently travel on business trips to various locations. While on travel for a certain purpose, an opportunity to meet with potential leads or contacts who are not directly related to the purpose of the business trip may arise, however, the sales representative may be unaware of the current location of the potential lead and therefore not take advantage of the opportunity.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 1 shows an example database table of a mapping system according to an implementation of the disclosed subject matter.

FIG. 4 shows a computer according to an implementation of the disclosed subject matter.

FIG. 5 shows a network configuration according to an implementation of the disclosed subject matter.

DETAILED DESCRIPTION

Figure 2:
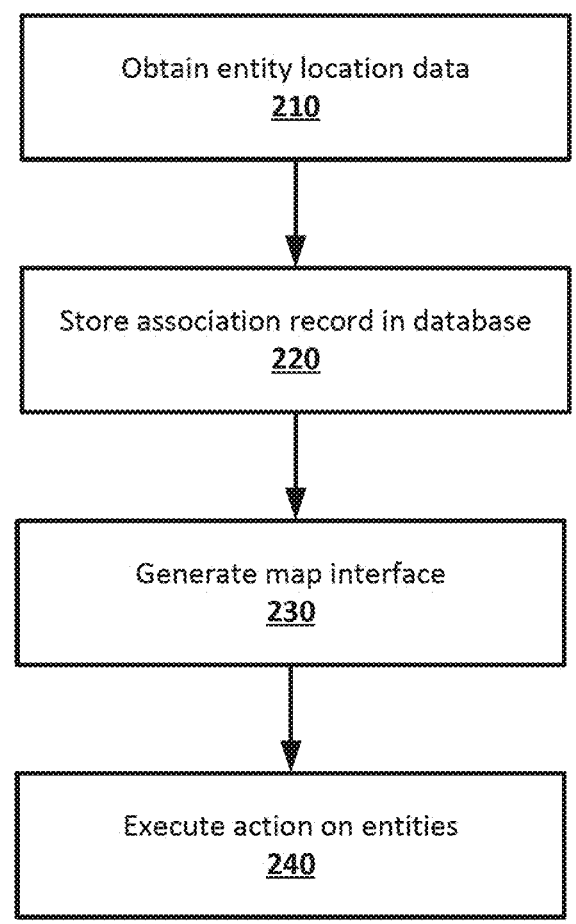
FIG. 2 shows an example method of generating a dynamic entity location map according to an implementation of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

In many circumstances it may be useful to obtain current location information for multiple entities, for which direct location information may not be available. For example, it may be desirable to obtain current location information for members of a group traveling together, such as a school or tour group, who may be distributed over a known geographic region. As another example, it may be desirable to identify locations of unrelated entities within a known or suspected geographic region who may have a common interest or other attribute, such as the capability of receiving a particular type of electronic communication. As another example, a business person on travel does not have a way to obtain accurate, current locations for multiple contacts, e.g., customers, clients, sales leads, or the like. Without this ability, the business person can miss critical opportunities, such as chances to connect with leads while travelling, timely delivery of targeted marketing or location based offers.

The disclosed subject matter addresses this problem by providing a mapping system to dynamically determine locations of entities for which at least some contact information is available ("contacts"), determine an inference about the context of the location (e.g., work, home, vacation), and provide an interface for easily checking a given region and taking mass action based on contacts likely to be present in that region. An interface of the mapping system can be used to filter potential contacts by location, as well as other parameters. Based on the display a user can obtain the most recently known location of a given contact and/or execute mass actions targeting groups of contacts, for example, by region. Provided with this knowledge and capability, a business person will have the advantage of being able to connect with contacts and create custom campaigns targeting contacts based on customized parameters and dynamic location data.

FIG. 1 shows an example database table 100 of a mapping system according to an implementation of the disclosed embodiments. A user's contacts or potential leads can be referred to as entities. The database table 100 stores records of one or more entities 110. Multiple characteristics 120 can be stored associated with the entities as part of the records.

In an implementation of the disclosed embodiments, at least one of the characteristics is a location characteristic 130. The location characteristic 130 stores location data related to an entity. The location data can be stored as, for example, a city, a country, a geographic region, longitude and latitude coordinates, an address, or other types of geographical position information.

In addition to the location characteristic 130, the database table 100 can store additional characteristics for each record, including location context (discussed below), entity contact information, entity title, timestamp data indication a date and time the location data was obtained, device data indication a make and/or model of the device being used when the location was obtained, as well as other types of characteristics.

FIG. 2 shows an example computer-implemented method 200 by which a mapping system generates a dynamic entity location map according to an implementation of the disclosed embodiments. At operation 210 the mapping system automatically obtains location data of an entity. The location data can be obtained in any of multiple ways. In one embodiment the location data is obtained by processing a notification data received from an electronic communication, such as an email, sent to the entity. For example, the user can send an email to the entity. When the email is received and downloaded by the entity's electronic device (e.g., cellphone, computer, wearable electronic, television, etc.), the device can transmit notification data to the system. The notification data can include metadata, such as an IP address of the email recipient, platform the email was opened on, device the email was opened on, etc. Based on metadata, such as the IP address, the system can calculate location data that indicates a geographical region in which the email was opened. Alternatively or in addition, a geographic location at which the email was opened based upon other metadata in the email, such as header information that indicates a particular server or other component that served as a relay for delivery of the email, and for which location information may be obtained (such as via an IP address of the server). Other electronic communication techniques may be used as well, such as proprietary communication channels that provide similar metadata.

In another embodiment the mapping system can obtain location data by sending the entity an email containing a link to a component stored on a server. When the email is opened on a device, the device sends a request to download the component. The request can include metadata about the device, which can be processed to determine a geographic location of the device, make/model of the device, operating system of the device, etc.

In yet another embodiment the mapping system can obtain location data by sending the entity an email including a customized link to a website. The link can include an identifier configured to correspond to the entity. When the entity clicks the link and visits the website, information can be obtained about the computing device visiting the website, including an IP address, make and model of the device, operating system, etc. The IP address can be converted into location data that indicates a geographical region that the customized link included in the email was clicked in.

The mapping system can adjust the level of geographic location data that is obtained in order to meet international standards. For example, for an email opened in a first country the mapping system may obtain latitude and longitude data indicating where the email was opened while for email opened in a second country the mapping system may only obtain location data indicating a general region, etc.

The above-described techniques for obtaining location data are included as examples. The disclosed subject matter is not limited to these methods of a mapping system obtaining location data for a given entity. Furthermore in any technique the mapping system can be integrated into a user's email client and obtain location data for entities through the ordinary course of the user's email correspondence with his/her contacts.

At operation 220 an association of location data with the entity is stored as a record in a database. Additional data can be stored as additional parts or characteristics of the record, including timestamp data (date, time), device data (e.g., type of device, model of device), operating system, etc. Over time a plurality of records for a plurality of entities can be stored in the database.

By including device data and timestamp data as part of the record, the mapping system can continually and dynamically update location data for stored entities, as well as updating additional secondary information. For example, location data obtained over a given period of time may indicate that a contact consistently opened emails in San Francisco in the morning on a desktop computing device, then opened an email at night in Vancouver on a mobile device. The mapping system can infer information from trends, patterns and breaks in patterns in the obtained location data and secondary data for a given entity.

For example, in an implementation of the disclosed embodiments, the mapping system can identify, among the records stored in the database, a set of records associated with a given entity that each have location data within a threshold of similarity. The threshold of similarity can be based on the type of location data associated with the records of the given entity. For example, referring to FIG. 1, the entity "John A. Smith" has multiple records 140 that include location data stored in the form of longitude and latitude coordinates. For this type of location data a threshold of similarity can be defined in terms of degrees, e.g., location data with a range of 0.1 degrees can found to indicate similar locations. Accordingly, the set of records 140 with location data of 40.7,−73.8 and 40.7,−73.9 can be determined to be within a threshold of similarity. By defining a range in this manner minor variations in geographic position of location data that is actually the same context (e.g., at an office) can be accounted for.

When a set of records with a similar location have been identified, the mapping system can determine a context for the set of records based on predetermined contextual rules and store the context as a characteristic in each record in the set of records. Multiple contextual rules can be defined for the disclosed mapping system. For example, in an implementation of the disclosed embodiments, a first contextual rule can define a first context as a residual context for a set of similar location data records when: 1) a number of records in the set exceeds a threshold amount (e.g. more than two records), and 2) each record in the set has a time portion of the timestamp data falling within a predefined range (e.g. within a month).

Referring to FIG. 1, the set of three records 140 for the "John A. Smith" entity that are found to be in a similar location satisfy the example requirements of the first contextual rule. That is, the number of records in the set (3) exceeds the threshold number (2) and include timestamp data that falls within a one month range. Therefore, the mapping system can determine that this set has a residual context (e.g. "Office") and update each record in the set accordingly.

The contextual rules definition can include a prior determination of a context for an entity. For example, consider an implementation of the disclosed embodiments that already determined and recorded the "Office" context as a first context as shown in FIG. 1. For records of a given entity, the predetermined contextual rules can define a second context as a "traveling" context for records that have location data falling outside of a predetermined range of the location data for records that have a residual context. Applying this rule, the record 150 that includes location data (38.9,−77) outside of a predetermined threshold (e.g., 3 degrees) of the already established residual location data (i.e., 40.7,−73.8) can be identified as having a traveling context (e.g. "Travelling").

The contextual rules definition can include other characteristics, when available, to further improve the accuracy of the context determination. For example, the contextual rules can define a context as a residual context when: 1) a number of records in set of records having similar location data exceeds a threshold amount, 2) each record has a time portion of the timestamp data fall within a predefined range, and 3) each record has identical device data. Referring to FIG. 1, the set of records 140 meets the requirements of the definition.

Likewise, a contextual rule definition can include a combination of additional characteristics and previous contextual determinations, such as defining a context as a traveling context when: 1) a record for an entity has location data falling outside of a predetermined range of the location data for records of that entity that have a residual location, and 2) the record device data is not identical to the device data of those records for the entity that have the residual context.

The disclosed subject matter is not limited to the example contextual rules described above. The examples are included to provide a better understanding of the contextual rules. Other contextual rules not specifically described fall within the scope of the disclosed subject matter.

Referring back to FIG. 2, after the mapping system has stored records in the database associating one or more entities with location data (and potentially other data, such as timestamp data and contextual data as described above), at operation 230 the mapping system generates an interactive map interface. For a given displayed region, the mapping system checks whether the most recently obtained location data (e.g., based on timestamp data) for any entity falls within the displayed region. For any most recently obtained location data that falls within the displayed region, the map interface displays an icon for the corresponding entity at a position based on the most recently obtained location data.

Figure 3:
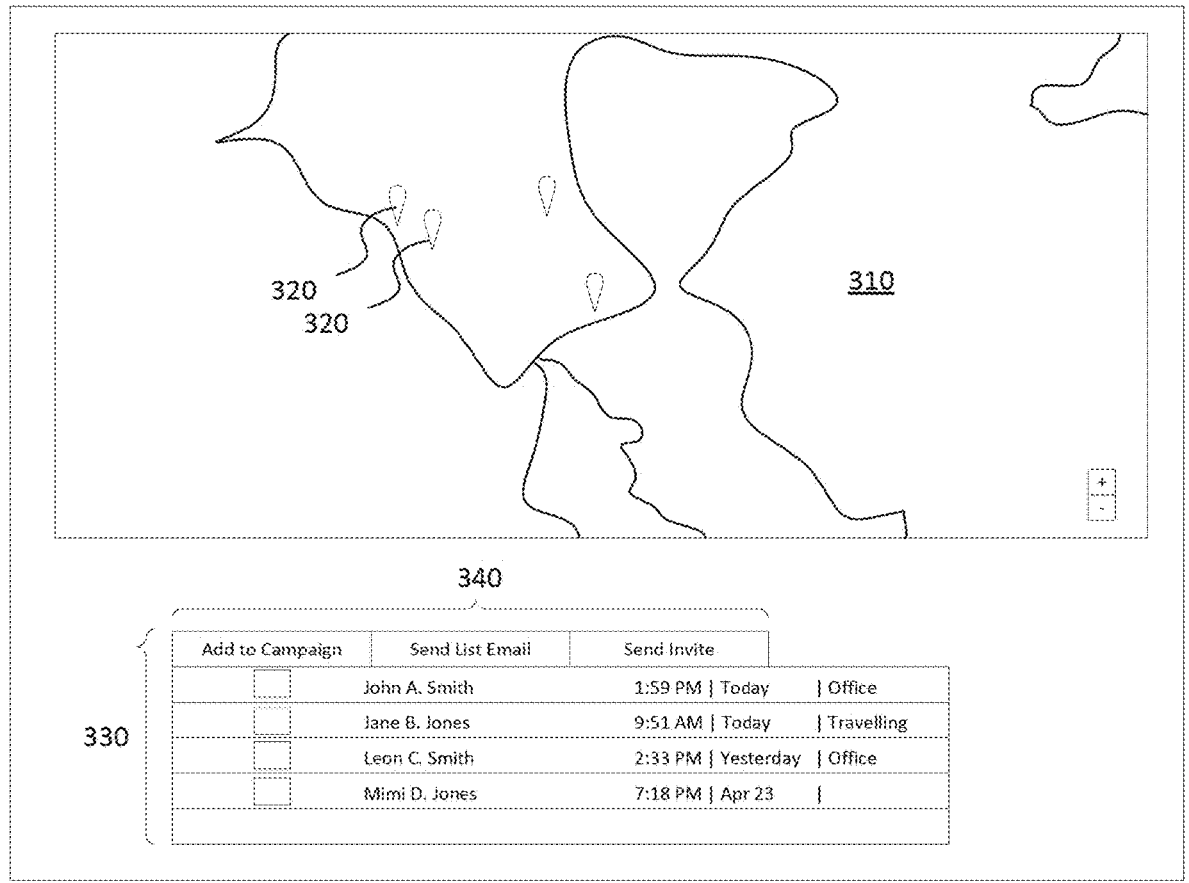
FIG. 3 shows an example map interface display and action interface display according to an implementation of the disclosed subject matter.

FIG. 3 shows an example map interface display 300 that can be generated by a mapping system according to the disclosed embodiments. The map interface display 300 includes a map 310 of a geographic region. Icons 320 are placed at positions on the map that correspond to most recently obtained location data for entity records in the mapping system database.

The interface display 300 includes an action interface 330 which shows a listing of entities that are within the displayed region. As the user pans or zooms the map to adjust the displayed region, the mapping system checks the database of records and updates the action interface 300 listing in accordance with the displayed region, and likewise adds or removes icons 320 from map display 310. With this functionality a user can easily and quickly see a visual display of last known positions of entities (e.g., the user's contacts).

The action interface 330 can include additional data about the contacts, such as name, title, the time and date that the last known location data was obtained, contextual data, etc. These display settings can be controlled by user in accordance with the user's preference.

Referring to FIGS. 2-3, at operation 240 the mapping system can execute an action. To facilitate the execution, the action interface 330 can include action functions 340 that can be executed on one or more of the listed entities. Action functions can include, for example, add to a campaign, send a list email, send a premade email template, send an invite to an event, etc. The action interface 330 can include a selection function, such as checkboxes, that allow a user to select multiple entities that the action function can be applied to. Thus, a user can easily adjust the map to a target area, view contacts that are (or are known to have been) in the target area, select one or more of the contacts for a mass action, and execute the mass action.

The disclosed mapping system greatly aids a user who travels. The disclosed mapping system can automatically, dynamically and continuously obtain location data for contacts, determine a context for the location data, provide a map-based interface to display contacts in a given geographic location, and an action interface to execute mass action on the displayed contacts. For example, a user preparing to travel to San Francisco, then Vancouver for a pair of conferences can immediately focus the disclosed map interface on the San Francisco region and at a glance see a listing of clients that both reside there and happen to be traveling there. Using the disclosed action interface, the user can easily send a first targeted email to all clients that are traveling in San Francisco and a second targeted email to all clients who reside in San Francisco. The user can shift the disclosed map interface to Vancouver and immediately see a listing of clients who reside in or are travelling in Vancouver and send appropriate targeted emails.

Implementations of the presently disclosed subject matter may be implemented in and used with a variety of component and network architectures. FIG. 4 is an example computer 600 suitable for implementing implementations of the presently disclosed subject matter. As discussed in further detail herein, the computer 600 may be a single computer in a network of multiple computers. As shown in FIG. 4, the computer 600 may communicate with a central or distributed component 700 (e.g., server, cloud server, database, cluster, application server, etc.). The central component 700 may communicate with one or more other computers such as the second computer 800, which may include a storage device 810. The second computer 800 may be a server, cloud server, or the like. The storage 810 may use any suitable combination of any suitable volatile and non-volatile physical storage mediums, including, for example, hard disk drives, solid state drives, optical media, flash memory, tape drives, registers, and random access memory, or the like, or any combination thereof.

Data, such as the records discussed above, may be stored in any suitable format in, for example, the storage 810, using any suitable filesystem or storage scheme or hierarchy. For example, the storage 810 may store data using a log structured merge (LSM) tree with multiple levels. Further, if the systems shown in FIGS. 4-5 are multitenant systems, the storage may be organized into separate log structured merge trees for each instance of a database for a tenant. Alternatively, contents of all records on a particular server or system may be stored within a single log structured merge tree, in which case unique tenant identifiers associated with versions of records may be used to distinguish between data for each tenant as disclosed herein. More recent transactions may be stored at the highest or top level of the tree and older transactions may be stored at lower levels of the tree. Alternatively, the most recent transaction or version for each record (i.e., contents of each record) may be stored at the highest level of the tree and prior versions or prior transactions at lower levels of the tree.

The information obtained to and/or from a central component 700 may be isolated for each computer such that computer 600 may not share information with computer 800. Alternatively or in addition, computer 600 may communicate directly with the second computer 800.

The computer (e.g., user computer, enterprise computer, etc.) 600 includes a bus 610 which interconnects major components of the computer 600, such as a central processor 640, a memory 670 (typically RAM, but which may also include ROM, flash RAM, or the like), an input/output controller 680, a user display 620, such as a display or touch screen via a display adapter, a user input interface 660, which may include one or more controllers and associated user input or devices such as a keyboard, mouse, WiFi/cellular radios, touchscreen, microphone/speakers and the like, and may be closely coupled to the I/O controller 680, fixed storage 630, such as a hard drive, flash storage, Fibre Channel network, SAN device, SCSI device, and the like, and a removable media component 650 operative to control and receive an optical disk, flash drive, and the like.

The bus 610 enable data communication between the central processor 640 and the memory 670, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 600 can be stored on and accessed via a computer readable medium, such as a hard disk drive (e.g., fixed storage 630), an optical drive, floppy disk, or other storage medium 650.

The fixed storage 630 may be integral with the computer 600 or may be separate and accessed through other interfaces. A network interface 690 may provide a direct connection to a remote server via a telephone link, to the Internet via an internet service provider (ISP), or a direct connection to a remote server via a direct network link to the Internet via a POP (point of presence) or other technique. The network interface 690 may provide such connection using wireless techniques, including digital cellular telephone connection, Cellular Digital Packet Data (CDPD) connection, digital satellite data connection or the like. For example, the network interface 690 may enable the computer to communicate with other computers via one or more local, wide-area, or other networks, as shown in FIG. 5.

Many other devices or components (not shown) may be connected in a similar manner (e.g., data cache systems, application servers, communication network switches, firewall devices, authentication and/or authorization servers, computer and/or network security systems, and the like). Conversely, all of the components shown in FIG. 5 need not be present to practice the present disclosure. The components can be interconnected in different ways from that shown. Code to implement the present disclosure can be stored in computer-readable storage media such as one or more of the memory 670, fixed storage 630, removable media 650, or on a remote storage location.

FIG. 5 shows an example network arrangement according to an implementation of the disclosed subject matter. Four separate database systems 1200a-d at different nodes in the network represented by cloud 1202 communicate with each other through networking links 1204 and with users (not shown). Each of database systems 1200 may be operable to host multiple instances of a database, where each instance is accessible only to users associated with a particular tenant. Each of the database systems may constitute a cluster of computers along with a storage area network (not shown), load balancers and backup servers along with firewalls, other security systems, and authentication systems. Some of the instances at any of systems 1200 may be live or production instances processing and committing transactions received from users or from computing elements (not shown) for ingesting and providing data for storage in the instances.

The database systems, for example 1200c, may include at least one storage device, such as in FIG. 6. For example, the storage may include memory 670, fixed storage 630, removable media 650, a storage device included with the central component 700 and/or the second computer 800, and/or one or more storage devices associated with one or more of the database systems 1200a-1200d.

In some implementations, the one or more servers shown in FIGS. 4-5 may store the data in an immutable storage of the at least one storage device (e.g., a storage device associated with central component 700, the second computer 800, and/or the database systems 1200a-1200d) using a log-structured merge tree data structure.

The systems and methods of the disclosed subject matter may be for single tenancy and/or multi-tenancy systems. Multi-tenancy systems may allow various tenants, which may be, for example, users, groups of users, or organizations, to access their own records on the server system through software tools or instances on the server system that may be shared among the various tenants. The contents of records for each tenant may be part of a database for that tenant. Contents of records for multiple tenants may all be stored together within the same server system, but each tenant may only be able to access contents of records which belong to, or were created by, that tenant. This may allow a server system to enable multi-tenancy without having to store each tenants' contents of records separately, for example, on separate servers or server systems. The database for a tenant may be, for example, a relational database, hierarchical database, or any other suitable database type. All records stored on the server system may be stored in any suitable structure, including, for example, a LSM tree.

A record as disclosed herein may be identified by a key-value pair in the instance of a multi-tenant system. In the implementations discussed above, the databases may or may not have notions of tenancy. Tenancy in the databases may be created by one or more virtual overlays, so that a user may view, access, and/or perform operations for a tenancy associated with an authorized user of a database system. The value may be, for example, the contents of a row of a table of a relational database, an identification of a row in a table of a relational database, or any other suitable value. The key may be an identifier for the record, and may in any suitable form, such as, for example, an alphanumeric sequence. Portions of the key may provide information about the contents of the record. For example, a portion of the key may be a tenant identifier, which may uniquely identify the tenant to whom the contents of the record belongs. Other portions of the key may identify, for example, a table number and identification of a row, for example, when the value of a record is the contents of a row, or table number, index number on the table, and an identification of indexed columns when the value is the identification of a row.

Further, a multitenant system may have various tenant instances on server systems distributed throughout a network with a computing system at each node. The live or production database instance of each tenant may only have its transactions processed at one computer system. The computing system for processing the transactions of that instance may also process transactions of other instances for other tenants.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computerized method for creating a dynamic entity location map, comprising:
   sending an electronic communication to a first entity;
   obtaining, when the electronic communication is opened, notification data;
   calculating a location at which the electronic communication was opened based on the notification data;
   storing, in a database, a record that contains an association of the location and the first entity, wherein the database stores a plurality of records of entities with associated location data;
   identifying, among the plurality of records, a set of records each having location data within a threshold of similarity;
   determining a first context for the set of records based on predetermined contextual rules;
   storing the first context in each record in the set of records; and
   generating a map interface that displays a geographical region and displays an icon for the first entity, the icon being displayed at a position within the geographical region based on the association of the location and the first entity.

2. The method of claim 1, further comprising storing, in the record: 1) timestamp data indicating a date and time at which the electronic communication was opened, and 2) device data indicating a type of device on which the electronic communication was opened.

3. The method of claim 2, further comprising:
   storing a plurality of records associated with the first entity, the plurality of records each including location data; and
   displaying the icon for the first entity at a position based on the location data of whichever record among the plurality of records has the most recent timestamp data.

4. The method of claim 2, wherein the predetermined contextual rules defines the first context as a residual context when a number of records in the set, exceeding a threshold amount, each has a time portion of the timestamp data falling within a predefined range.

5. The method of claim 4, wherein the predetermined contextual rules defines a second context as a traveling context for a record among the plurality of records that has location data falling outside of a predetermined range of the location data for records having a residual context.

6. The method of claim 2, wherein the predetermined contextual rules defines the first context as a residual context when a number of records in the set, exceeding a threshold amount, each has a time portion of the timestamp data fall within a predefined range and each has identical device data.

7. The method of claim 6, wherein the predetermined contextual rules defines a second context as a traveling context for a record among the plurality of records that has location data falling outside of a predetermined range of the location data for records having a residual location and has device data that is not identical to the device data of records having the residual context.

8. The method of claim 1, further comprising:
   displaying an action interface including a listing of entities displayed in the map interface; and
   updating the listing of displayed entities in the action interface, when the displayed region of the map interface is changed, to correspond to entities currently displayed in the map interface.

9. The method of claim 8, wherein the action interface comprises:
   a selection function for entities in the listing of displayed entities to allow a user to select one or more entities in the listing of displayed entities; and
   at least one action function to apply an action to each displayed entity when selected.

10. The method of claim 9, wherein the action comprises sending a predetermined electronic communication message.

11. The method of claim 9, wherein the action comprises sending an invite to an event.

12. A system for creating a dynamic entity location map, comprising:
    at least one memory storing computer-executable instructions;
    a database storing a plurality of records; and
    at least one processor, wherein the at least one processor is configured to access the at least one memory and to execute the computer-executable instructions to:
    send an electronic communication to a first entity;
    obtain, when the electronic communication is opened, notification data;
    calculate a location at which the electronic communication was opened based on the notification data;
    store, in the database, a record that contains an association of the location and the first entity;
    identify, among the plurality of records, a set of records each having location data within a threshold of similarity;
    determine a first context for the set of records based on predetermined contextual rules;
    store the first context in each record in the set of records; and
    generate a map interface that displays a geographical region and displays an icon for the first entity, the icon being displayed at a position within the geographical region based on the association of the location and the first entity,
    wherein the database stores a plurality of records of entities with associated location data.

13. The system of claim 12, wherein the processor is further configured to store, in the record: 1) timestamp data indicating a date and time at which the electronic communication was opened, and 2) device data indicating a type of device on which the electronic communication was opened.

14. The system of claim 13, wherein the processor is further configured to:
   store a plurality of records associated with the first entity, the plurality of records each including location data; and
   display the icon for the first entity at a position based on the location data of whichever record among the plurality of records has the most recent timestamp data.

15. The system of claim 13, wherein the predetermined contextual rules defines the first context as a residual context when a number of records in the set, exceeding a threshold amount, each has a time portion of the timestamp data falling within a predefined range.

16. The system of claim 15, wherein the predetermined contextual rules defines a second context as a traveling context for a record among the plurality of records that has location data falling outside of a predetermined range of the location data for records having a residual context.

17. The system of claim 13, wherein the predetermined contextual rules defines the first context as a residual context when a number of records in the set, exceeding a threshold amount, each has a time portion of the timestamp data fall within a predefined range and each has identical device data.

18. The system of claim 17, wherein the predetermined contextual rules defines a second context as a traveling context for a record among the plurality of records that has location data falling outside of a predetermined range of the location data for records having a residual location and has device data that is not identical to the device data of records having the residual context.

19. The system of claim 12, wherein the processor is further configured to:
   display an action interface including a listing of entities displayed in the map interface; and
   update the listing of displayed entities in the action interface, when the displayed region of the map interface is changed, to correspond to entities currently displayed in the map interface.

20. The system of claim 19, wherein the action interface comprises:
   a selection function for entities in the listing of displayed entities to allow a user to select one or more entities in the listing of displayed entities; and
   at least one action function to apply an action to each displayed entity when selected.

21. The system of claim 20, wherein the action comprises sending a predetermined electronic communication message.

22. The system of claim 20, wherein the action comprises sending an invite to an event.

* * * * *